(12) United States Patent
Hofer

(10) Patent No.: US 11,106,782 B2
(45) Date of Patent: Aug. 31, 2021

(54) CONTROL UNIT FOR A BATTERY SYSTEM

(71) Applicant: Samsung SDI Co., Ltd., Yongin-si (KR)

(72) Inventor: Maximilian Hofer, Hartberg (AT)

(73) Assignee: SAMSUNG SDI CO., LTD, Yongin-si (KR)

( * ) Notice: Subject to any disclaimer, the term of this patent is extended or adjusted under 35 U.S.C. 154(b) by 243 days.

(21) Appl. No.: 16/343,220

(22) PCT Filed: Oct. 20, 2017

(86) PCT No.: PCT/KR2017/011683
§ 371 (c)(1),
(2) Date: Apr. 18, 2019

(87) PCT Pub. No.: WO2018/105884
PCT Pub. Date: Jun. 14, 2018

(65) Prior Publication Data
US 2019/0243962 A1     Aug. 8, 2019

(30) Foreign Application Priority Data

Dec. 5, 2016  (EP) ..................................... 16202199

(51) Int. Cl.
*G06F 21/44*     (2013.01)
*G01J 5/28*     (2006.01)
(Continued)

(52) U.S. Cl.
CPC .............. *G06F 21/44* (2013.01); *G01J 5/28* (2013.01); *H01M 10/425* (2013.01); *G01J 5/028* (2013.01); *H01M 2010/4271* (2013.01)

(58) Field of Classification Search
USPC ....................................................... 320/107
See application file for complete search history.

(56) References Cited

U.S. PATENT DOCUMENTS

2006/0117176 A1  6/2006  Sasaki et al.
2009/0259771 A1  10/2009  Tanik et al.
(Continued)

FOREIGN PATENT DOCUMENTS

GB     2475612 A     5/2011
JP     2006-180457 A  7/2006
(Continued)

OTHER PUBLICATIONS

Extended European Search Report for European Patent Application No. 16202199.2, dated Jun. 12, 2017, 8pp.
(Continued)

*Primary Examiner* — Bryce M Aisaka
(74) *Attorney, Agent, or Firm* — Lewis Roca Rothgerber Christie LLP

(57) ABSTRACT

The present invention relates to a method for generating a security identifier for a control unit (10) of a battery system (100), comprising the steps of supplying an operation voltage to the control unit (10), outputting calibration data from a non-volatile memory element (15*a*) of the control unit (10), and generating a security identifier from the calibration data using a security algorithm. Therein, the calibration data is based on at least one testing process performed on the control unit (10) and is required for a faultless operation of the control unit (10). Further, according to a method for generating an activation key for a control unit (10) of a battery system (100) an activation key is generated based on such security identifier and output from the control unit (10). The invention further relates to an activation method for such control unit (10), wherein a control unit (10) is activated in response to the validation of such security identifier. The present invention further relates to a control unit (10) for performing such methods and further relates to the use of calibration data for generating a security identifier.

15 Claims, 5 Drawing Sheets

(51) Int. Cl.
*H01M 10/42* (2006.01)
*G01J 5/02* (2006.01)

(56) References Cited

U.S. PATENT DOCUMENTS

| | | |
|---|---|---|
| 2010/0027309 A1 | 2/2010 | Park |
| 2010/0034238 A1* | 2/2010 | Bennett .................. H02J 5/005 375/130 |
| 2011/0066309 A1 | 3/2011 | Matsuoka et al. |
| 2012/0049787 A1* | 3/2012 | Kuroiwa ................. B60L 53/66 320/106 |
| 2012/0223671 A1 | 9/2012 | Seethaler et al. |
| 2014/0189890 A1 | 7/2014 | Koeberl et al. |
| 2014/0344613 A1 | 11/2014 | Byeon |
| 2015/0048684 A1 | 2/2015 | Rooyakkers et al. |

FOREIGN PATENT DOCUMENTS

| | | |
|---|---|---|
| KR | 10-2009-0082808 A | 7/2009 |
| KR | 10-2011-0005822 A | 1/2011 |
| KR | 10-2013-0033197 A | 4/2013 |
| KR | 10-2014-0136201 A | 11/2014 |
| WO | WO 2011/089143 A1 | 7/2011 |
| WO | WO 2013/150343 A1 | 10/2013 |

OTHER PUBLICATIONS

European Office action for European Patent Application No. 16 202 199.2, dated Jun. 13, 2018, 7pp.

B. Skoric, et al., "Robust key extraction from physical unclonable functions", Applied Cryptography and Network Security, vol. 3531 of LNCS (Lecture Notes in Computer Science), 2005, pp. 407-422.

G. Edward Suh, et al., "Physical unclonable functions for device authentication and secret key generation", Proceedings of the 44th annual design automation conference, 2007, pp. 9-14.

Mafalda Cortez, et al., "Modeling SRAM start-up behavior for Physical Unclonable Functions", 2012 IEEE International Symposium on Defect and Fault Tolerance in VLSI and Nanotechnology Systems (DFT), 6pp.

* cited by examiner

[Fig. 1]
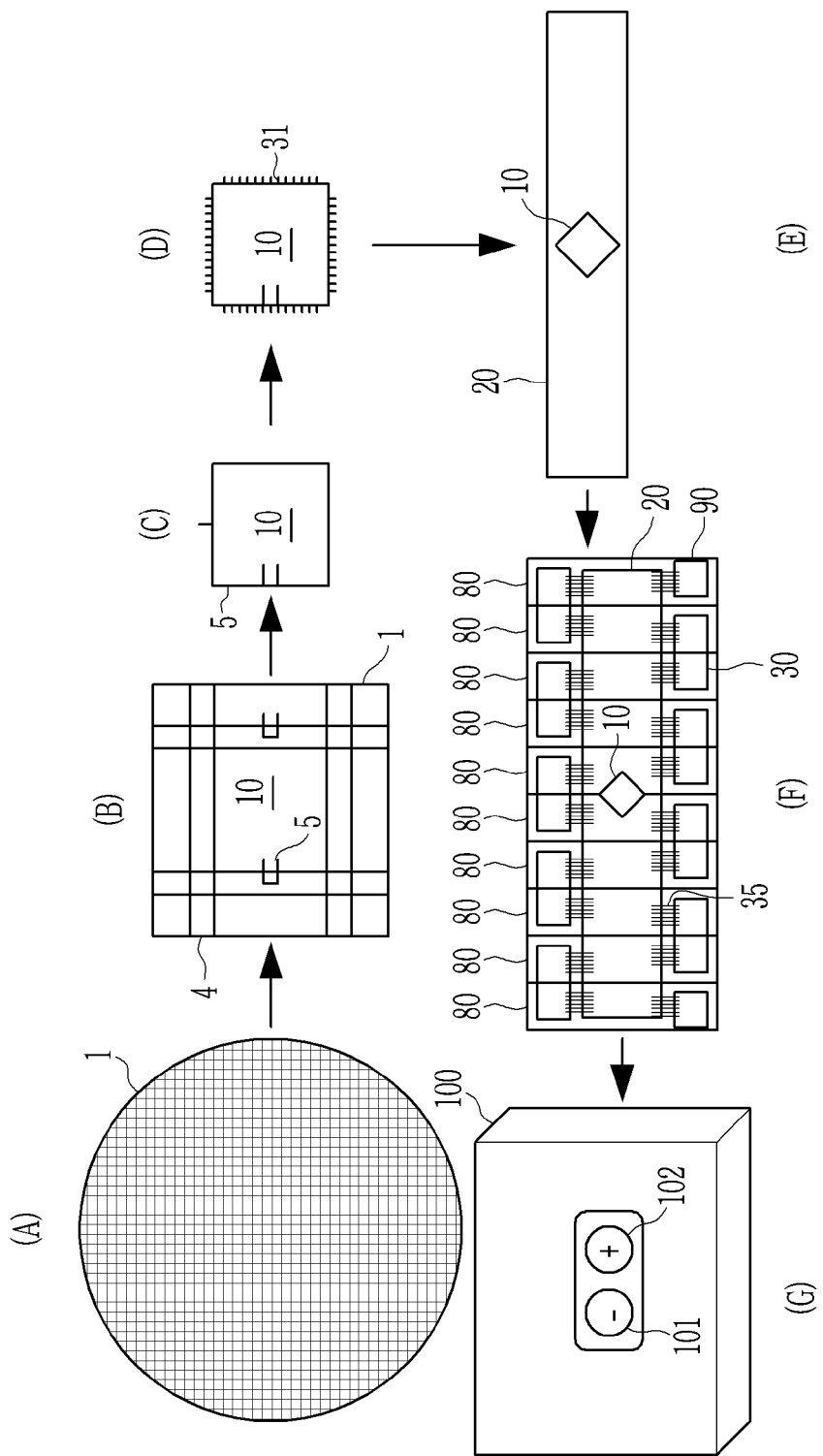

[Fig. 2]
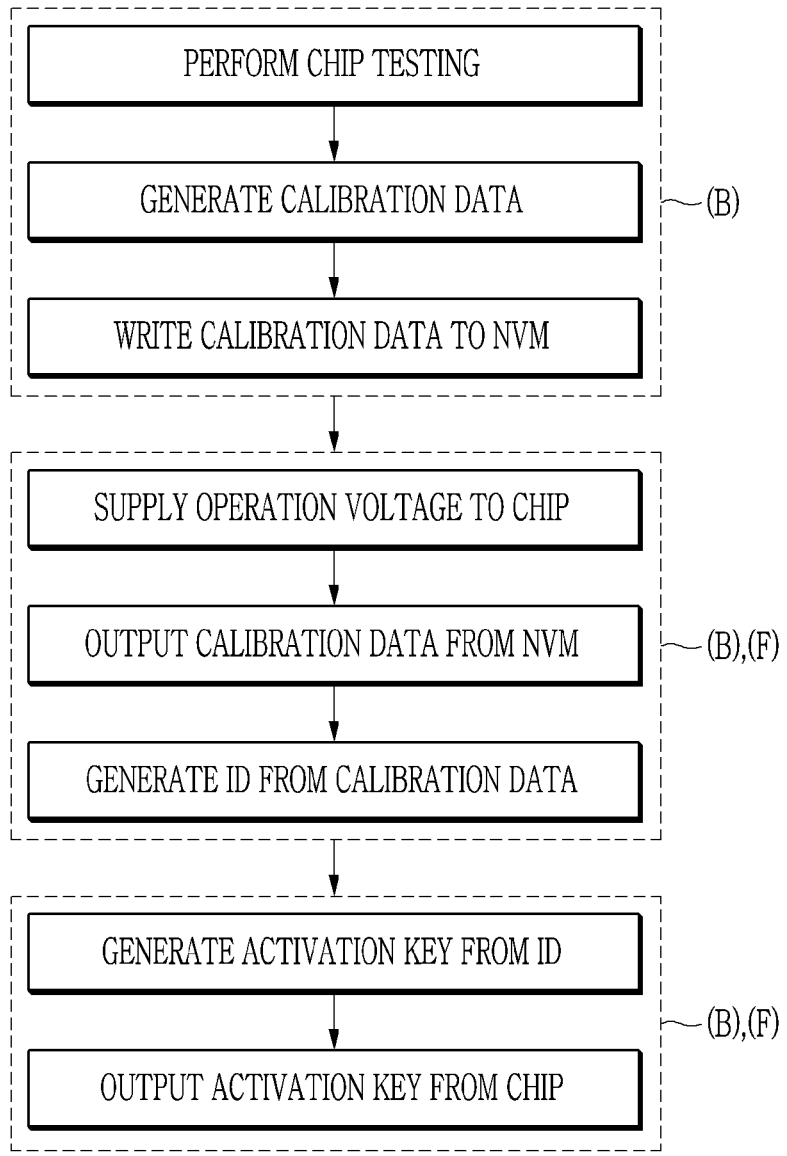

[Fig. 3]
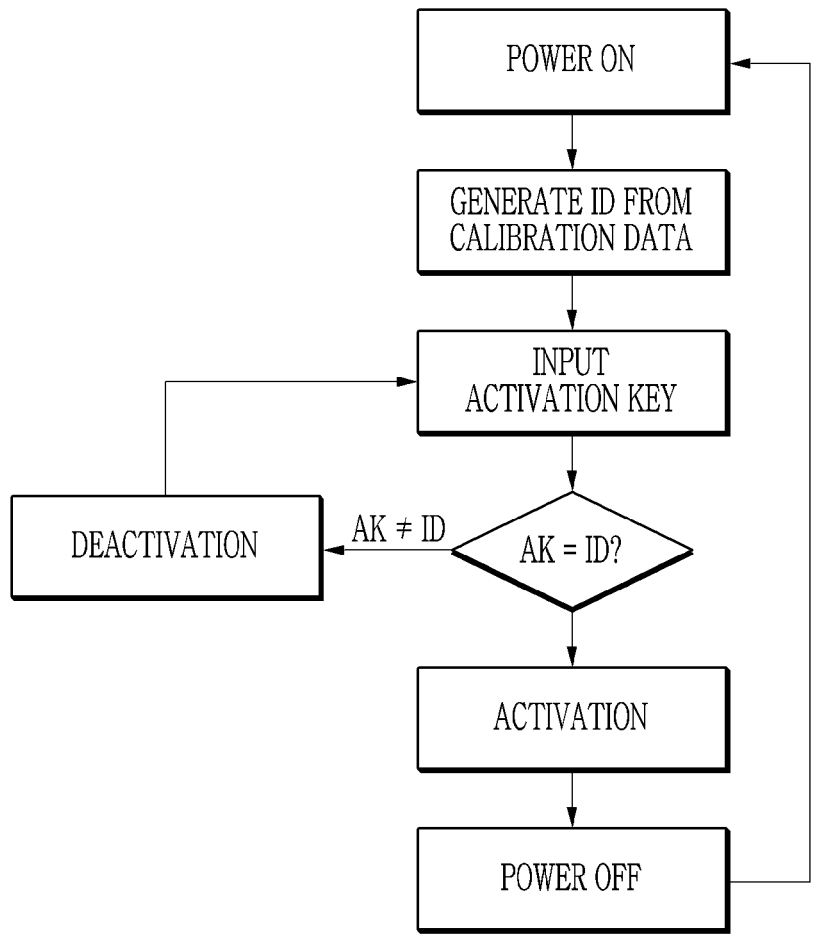
[Fig. 4]
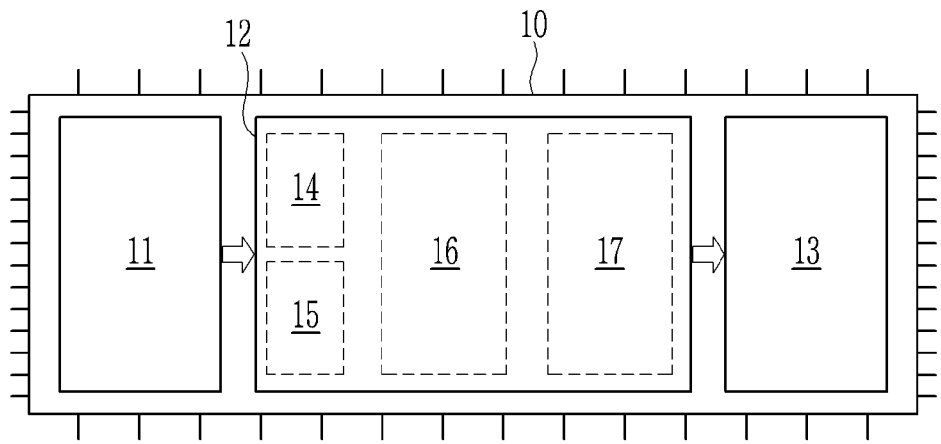

[Fig. 5]
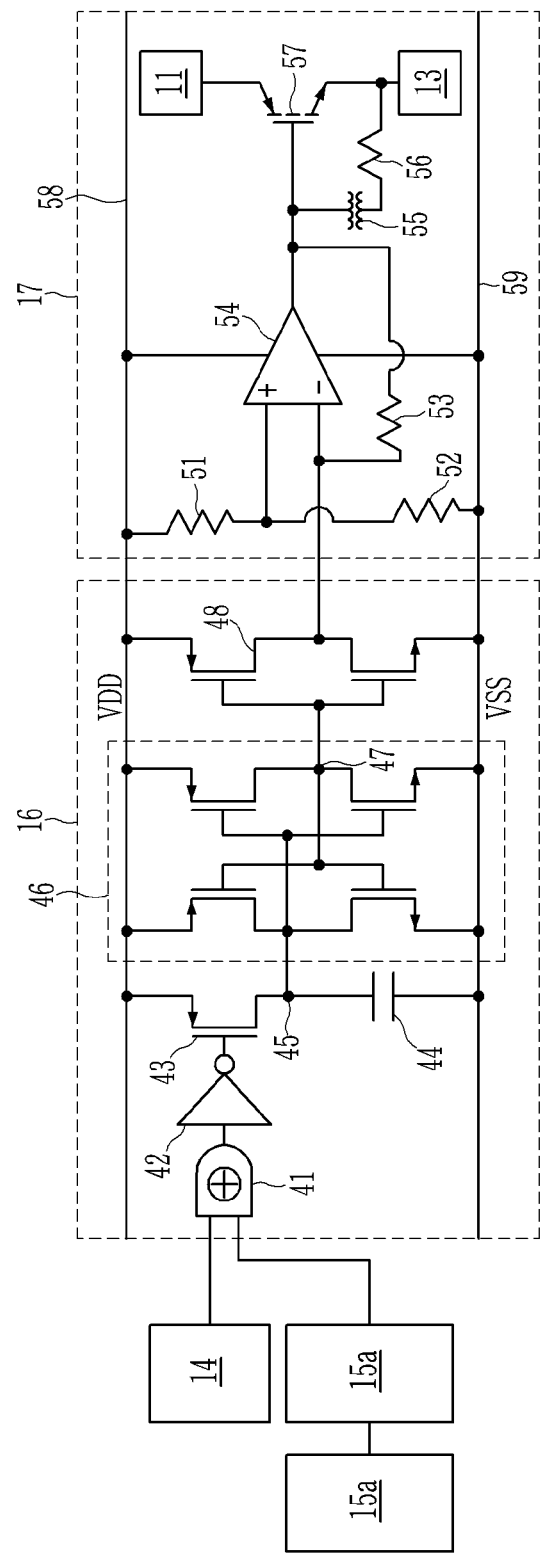

[Fig. 6]
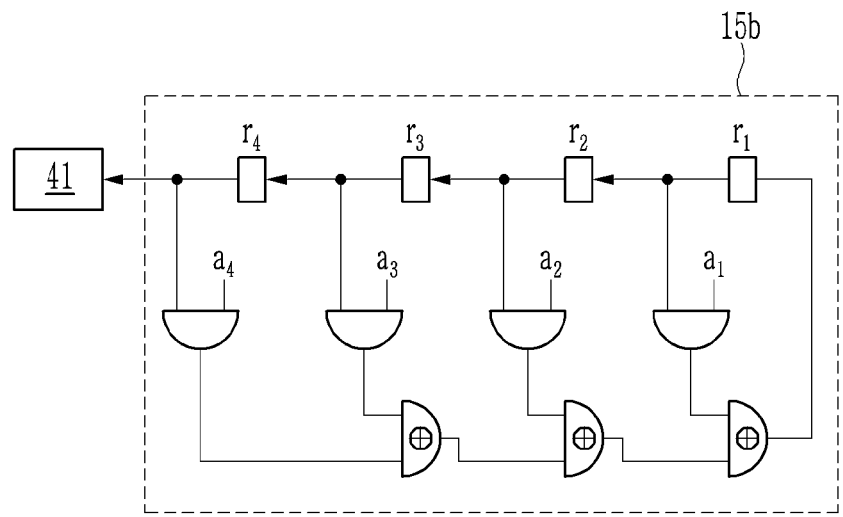
[Fig. 7]
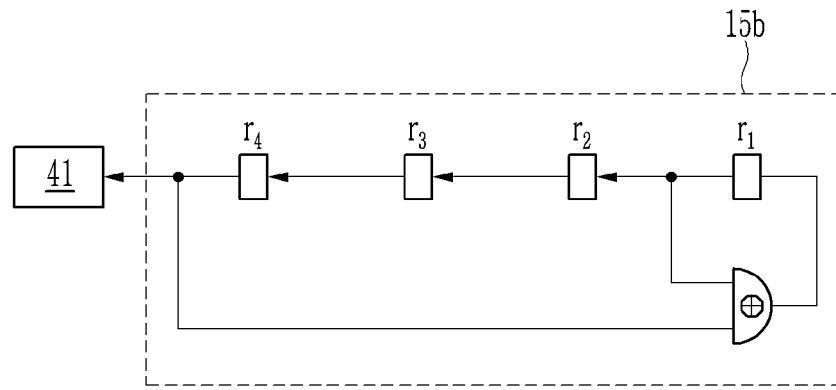

CONTROL UNIT FOR A BATTERY SYSTEM

CROSS-REFERENCE TO RELATED APPLICATION(S)

This application is a National Phase Patent Application of International Patent Application Number PCT/KR2017/011683, filed on Oct. 20, 2017, which claims priority of European Patent Application No. 16202199.2, filed Dec. 5, 2016. The entire contents of all of which are incorporated herein by reference.

TECHNICAL FIELD

The present invention relates to a method for generating a security identifier for a control unit of a battery system, a method for generating an activation key for such a control unit, a method for activating such a control unit, a control unit for a battery system, a battery system comprising such control unit and to the use of calibration data for generating a security identifier for a control unit of a battery system.

BACKGROUND ART

A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g. cylindrical or rectangular, depends on the battery's intended purpose.

Rechargeable batteries may be used as a battery module formed of a plurality of unit battery cells coupled in series and/or in parallel so as to provide a high energy density, e.g. for motor driving of a hybrid vehicle. That is, the battery module is formed by interconnecting the electrode terminals of the plurality of unit battery cells depending on a required amount of power and in order to realize a high-power rechargeable battery, e.g. for an electric vehicle. One or more battery modules are mechanically and electrically integrated, equipped with a thermal management system and set up for communication with one or more electrical consumers in order to form a battery system.

For meeting the dynamic power demands of various electrical consumers connected to the battery system a static control of battery power output and charging is not sufficient. Thus, steady or intermittent exchange of information between the battery system and the controllers of the electrical consumers is required. This information includes the battery systems actual state of charge (SoC), potential electrical performance, charging ability and internal resistance as well as actual or predicted power demands or surpluses of the consumers.

For monitoring, controlling and/or setting of the aforementioned information a battery system usually comprises a battery management unit (BMU) and/or a battery management system (BMS). Such control units may be an integral part of the battery system and disposed within a common housing or may be part of a remote controller communicating with the battery system via a suitable communication bus. In both cases, the control unit communicates with the electrical consumers via a suitable communication bus, e.g. a CAN or SPI interface.

The BMS/BMU is usually coupled to the controller of one or more electrical consumers as well as to each of the battery modules of the battery system. Usually each battery module comprises a cell supervision circuit (CSC) that is configured to maintain the communication with the BMS/BMU and with other battery modules. The CSC may be further configured to monitor the cell voltages of some or each of the battery module's battery cells and to actively or passively balance the voltages of the individual battery cells within the module.

The service life of the aforementioned control units, i.e. BMS, BMU and CSC, might exceed the service life of the controlled battery cell(s). In principle, control units that were introduced to the market by an original equipment manufacturer (OEM) might thus be reused with replacement battery cells once the original cells quit functioning. However, as control units and battery cells are perfectly coordinated such reuse poses high risks for battery malfunctions. And as malfunctioning battery cells might lead to fire, explosions and/or release of harmful substances, OEMs are interested in preventing the reuse of battery control units. OEMs might also be interested in preventing counterfeiting of the control electronics as faked products reduces the OEM's income and might be harmful to the OEM's reputation.

According to an approach for securing a control unit against unauthorized reuse or counterfeiting a security identifier might be written to a non-volatile memory element of the control unit, e.g. during processing or testing of the control unit. The security identifier can be used to generate a cryptographic key or might function as cryptographic key. However, writing the security identifier to the control unit poses the risk that an attacker might read out the security identifier or might overwrite the non-volatile memory element. Also the control unit can be easily cloned as only the non-volatile memory element is chip-individual.

According to another approach, a security identifier is not written to the control unit but instead generated from inherent physical properties of the control unit. In other words, the security identifier is not permanently stored but generated only when required. One possibility to realize such security identifier is to use a so called Physical Unclonable Function (PUF) that is embedded in a physical structure, such as an integrated circuit (IC) of the control unit. The PUF might be based on inherent, device-unique and deep sub-micron process variations during the manufacture of the IC. Skoric et al. disclose in *"Robust key extraction from physical unclonable functions"* (Applied Cryptography and Network Security, vol. 3531 of LNCS, pages 99-135, 2005; the full content of which is incorporated herein by reference) how PUFs can be used for security purposes.

A common type PUF are so called SRAM PUFs that are based on intrinsic mismatches between parameters of the SRAM's transistors, such as their threshold voltages $U_{th}$. The differences of threshold voltages of the SRAM's transistors can be read out and amplified in order to generate a PUF. Alternatively, the PUF is generated during the IC's power up, when a principally symmetric SRAM will take a certain logical value based on the transistor mismatches. However, while some SRAMs always provide the same logic value during power up others comprising roughly equal transistors will randomly output different values. An analysis of the variation of SRAM startup behavior was published by Cortez et al. in "*Modeling SRAM start-up behavior for Physical Unclonable Functions*" (DOI: 10.1109/DFT.2012.6378190; the full content of which is incorporated herein by reference). In order to avoid unpredictable behavior, the use of PUFs often requires storing helper data outside the chip, such that new security risks arise from the external memory.

It is thus an object of the present invention to provide a method for generating a security identifier for a control unit for a battery system that avoids or at least reduces one or more of the drawbacks of the prior art and to provide a control unit that allows to control its reuse and to prevent counterfeiting after an OEM has put the control unit on the market.

DISCLOSURE OF INVENTION

Solution to Problem

One or more of the drawbacks of the prior art could be avoided or at least reduced by means of the present invention. In particular, according to an aspect of the invention a method for generating a security identifier for a control unit of a battery system is provided that comprises the steps of supplying an operation voltage to the control unit, outputting calibration data from a non-volatile memory element of the control unit; and generating a security identifier from the calibration data using a security algorithm, wherein the calibration data is based on at least one testing process performed on the control unit, particularly on at least one result of such testing process, and wherein the calibration data is required for a faultless operation of the control unit, particularly with respect to at least one control function performed by the control unit with respect to at least one battery cell of the battery system.

In the context of the present invention, a control unit for a battery system can be one of a BMS, BMU or CSC and may further be an electronic circuit that is configured for controlling an individual battery cell. Usually, a control unit comprises one or more integrated circuits (ICs) that are mounted on a suitable circuit carrier, e.g. a printed circuit board (PCB). A control unit according to the present invention is usually supplied with an operation voltage by at least one battery cell that is controlled by the control unit, e.g. as a part of the battery system or the battery module that is controlled by the control unit. The operation voltage is a prerequisite for that the control unit performs at least one control function with respect to the battery system, battery module or at least one battery cell. The control functions may comprise the measurement of at least one cell voltage, cell current, cell resistance or cell capacity and may further comprise the active or passive balancing of cell voltages or cell currents of a plurality of battery cells. Suitable circuit designs for performing one or more of these control functions are known to the skilled person.

In the context of the present invention, a security algorithm preferably reduces a number of bits and increases the entropy per bit. In other words, the security identifier comprises fewer bits with higher information entropy than the calibration data. Hence, the probability that different control units comprise different security identifiers is higher than the probability that they comprise different calibration data. Thus, the security identifier is more suitable for cryptographic use than the calibration data. A simple embodiment of the security algorithm is an XOR function applied to two bits of the calibration data. Further preferred, the security algorithm is one of a hash function algorithm, a public key algorithm or a private key algorithm.

In the context of the present invention, a private key algorithm (symmetric encryption) uses a single key for both encryption and decryption. Examples for a private key algorithm include Data Encryption Standard (DES) algorithm, Advanced Encryption Standard (AES) algorithm, CAST-128/256 algorithm, International Data Encryption Algorithm (IDEA) algorithm, Rivest Ciphers algorithm, Blowfish algorithm, Twofish algorithm and the like. In the context of the present invention, a public key algorithm (asymmetric encryption) uses one key for encryption and another for decryption. Examples for a public key algorithm include RSA algorithm, Public-Key Cryptography Standards (PKCS) algorithm, Diffie-Hellman algorithm, Digital Signature Algorithm (DSA), ElGamal algorithm and the like. In the context of the present invention, hash function algorithms use a mathematical transformation to irreversibly encrypt information, thereby providing a digital fingerprint. Examples for Hash function algorithms include Message Digest (MD) algorithms, Secure Hash Algorithm (SHA), RIPEMD algorithm, Whirlpool algorithm, Tiger algorithm, eD2k algorithm and the like.

Preferably, the method according to the present invention further comprises the steps of performing at least one testing process on the control unit, generating calibration data for the control unit based on the at least one testing process, particularly on at least one result of such testing process, and writing the calibration data to a non-volatile memory element of the control unit. The calibration data may be generated by a manufacturer of the control unit (OEM). Alternatively, the calibration data is generated during setup of a control unit for a specific use by an authorized user. The calibration data is required for a faultless operation of the control unit and might be used for a calibration of data that is input to or output from the control unit and may be used constantly or intermittent during the use of the control unit.

The performance of the at least one testing process as well as the generation and the saving of the calibration data might be performed once at the beginning of life of the control unit. The steps of outputting calibration data from a non-volatile memory element of the control unit and of generating a security identifier from the calibration data using a security algorithm might be repeatedly performed during the service life of the control unit. Exemplarily, the security identifier might be generated (and validated) each time the control unit is powered up. Alternatively, the security identifier might be generated (and validated) in response to a certain verification signal input to the control unit, e.g. during an anti-counterfeiting control.

Preferably, the storing of the calibration data in the non-volatile memory element occurs during assembling or testing of the control unit. In other words, the calibration data is stored in the non-volatile memory element before an initial startup of the control unit. The calibration data is preferably hardware encoded into the non-volatile memory element, e.g. by setting a plurality of fusebits. Alternatively, the calibration data is written to a non-volatile memory element that is in principle capable of being written and read multiple times, e.g. a flash memory, during testing of the control unit. In the latter case, the method preferably further comprises the step of disabling a write access of the non-volatile memory element after writing the calibration data to the non-volatile memory element.

Particularly preferred, the calibration data is set only once during the testing and the calibration of the control unit. Thus, the risk of random fluctuations as they might occur in PUFs is drastically reduced, dependent on the quality of the non-volatile memory element. Further, no external helper data is required for identically reconstructing the security identifier, e.g. at each startup of the control unit. Advantageously, amending the security identifier requires amending the calibration data that is required for faultless operation of the control unit, particularly with respect to at least one control function. Hence, amending the security identifier will result in faulty operation of the control unit. According to the invention, calibration data necessary for faultless operation of the control unit is used for deriving a security identifier, wherein the security identifier might be used for different purposes such as identification and authentication of the control unit. The security identifier might be saved on the control unit. However, the security identifier is preferably not saved on the control unit but is generated whenever authentication or verification of the control unit is required.

According to another aspect of the present invention, a method for generating an activation key for a control unit of a battery system is provided. This method comprises the steps of the method for generating a security identifier for a control unit of a battery system as described above, and further comprises the steps of generating an activation key based on the security identifier and outputting the activation key from the control unit. The output activation key is preferably saved outside the control unit and might be handed to an authorized user of the battery system for allowing the user to activate the control unit. Preferably, the method for generating an activation key is performed only once by the manufacturer (OEM) of the control unit or by an authorized user during the assembly of the battery system. On the contrary, the method for generating a security identifier might be repeatedly performed, whenever the control unit is powered up. The activation key and the security identifier might be used in symmetric or asymmetric encryption schemes with one or both of the activation key and the security identifier being secret keys or one being a public key and the other being a private key. The activation key might be identical to the security identifier, might be a derivative of the security identifier or might related to the security identifier via a security algorithm.

Preferably, the control unit comprises at least one measurement circuit configured for measuring a physical quantity input to the measurement circuit and in the methods described above the at least one testing process comprises the steps of performing an offset calibration test and/or a gain calibration test on the measurement circuit, and the generation of the calibration data comprises the steps of generating at least one offset calibration value and/or at least one gain calibration value for each measurement circuit. Therein an offset calibration of the measurement circuit comprises the steps of detecting a measured value of the physical quantity, while the physical quantity is not actively applied to the measurement circuit, and setting the detected measured value as an offset calibration value. Further, the gain calibration of the measurement circuit comprises the steps of detecting a measured value of the physical quantity, while a predetermined value of the physical quantity is applied to the measurement circuit, and setting a difference between the detected measured value and the predetermined value as a gain calibration value.

Particularly preferred, the control unit comprises at least one voltage measurement circuit that is configured for measuring a voltage applied to an input of the voltage measurement circuit. Hence, in preferred embodiments of the methods according to the invention the at least one testing process comprises at least an offset calibration test and a gain calibration test of the voltage measurement circuit. Therein, an offset calibration test comprises detecting a voltage measured by the uncalibrated voltage measurement circuit, while no reference voltage, i.e. a reference voltage equal zero, is applied to an input of the measurement circuit. The detected voltage is then set as an offset calibration value. The gain calibration test comprises the steps of applying a predetermined reference voltage, i.e. a reference voltage not equal to zero, to an input of the voltage measurement circuit and detecting the voltage measured by the uncalibrated voltage measurement circuit. The difference between the detected voltage and the predetermined voltage is then set as a gain calibration voltage.

The measurement circuit may comprise means for measuring values of a voltage, a current, a capacity or the like of at least one battery cell. Further, the control unit, e.g. a control module of the control unit, may be further configured to actively balance the voltages, currents, capacities or the like of a plurality of battery cells based on the measured values. Hence, the accuracy of the measurements of the control unit, e.g. the measurement circuit, must be sufficient for ensuring a faultless operation of the control unit, e.g. the control module. This is achieved by performing a testing and calibration of the control unit. In other words, the calibration takes into account process variations that become apparent during testing and might also consider environmental conditions that might arise during the service life of the control unit. An exemplary documentation on the voltage calibration of a microcontroller can be found in "AVR353: Voltage Reference Calibration and Voltage ADC Usage" published online by ATMEL in 2008; the full content of which is incorporated herein by reference.

A single control unit is preferably configured for controlling, i.e. performing at least one control function, on a plurality of cells. Hence, a single control unit preferably comprises a plurality of measurement channels for measuring voltages, currents, capacities or the like of the respective cells. The calibration data might thus comprise values, e.g. offset calibration values and/or gain calibration values, for each channel of the control unit. The calibration data might further comprise values, e.g. offset calibration values and/or gain calibration values, for different environmental conditions. Particularly preferred, a plurality of offset calibration test is performed at a plurality of different temperatures. Further preferred, a plurality of gain calibration tests is performed at a plurality of different temperatures and/or for a plurality of different reference voltages. Hence, the calibration data preferably comprises a plurality of offset calibration value(s) and/or a plurality of gain calibration value(s) for each (voltage) measurement circuit. Hence, the calibration data for a single control unit might comprise a high number of calibration data bits. Thus, the probability of two different control units comprising identical sets of calibration data bits is therefore rather neglectable. As a consequence, a security identifier that is generated from the calibration data using a security algorithm, i.e. that comprises higher entropy than the calibration data, can be considered unique for each control unit.

Another aspect of the present invention relates to a method for activating a control unit for a battery system, wherein the control unit comprises a power input for an operation voltage of the control unit that is provided by at least one battery cell, a control module that is configured for performing at least control function with respect to the at least one battery cell, and a startup module that is connected between the power input and the control module. Therein, the activation method according to the invention comprises the steps of supplying an operation voltage of the control unit to the power input by the at least one battery cell, generating a security identifier from calibration data stored in a non-volatile memory element of the control unit by using a security algorithm of the control unit, validating the generated security identifier, and interconnecting the power input and the control module in response to the validation of the security identifier. According to the present invention, the calibration data is based on at least one testing process performed on the control unit and is required for a faultless operation of the control unit. Preferably, the method further comprises the step of setting a switch element in an activation circuit of the control unit conductive in response to the validation of the security identifier.

According to a preferred embodiment of the present invention, the security algorithm is implemented in the control unit. Particularly preferred, the security algorithm is hardware-encoded in the control unit. Exemplarily, the security algorithm may comprise a hardware implementation of a MD5 hash algorithm as described in "Hardware Implementation Analysis of the MD5 Hash Algorithm" by Jarvinen et al., 2005. According to such embodiment, the security algorithm is always copied with the control unit as a whole and is hard to amend.

The validation of the security identifier might comprise a comparison of the generated security identifier with a further security identifier that was created earlier, e.g. during testing of the control unit, and that is saved in a further non-volatile memory element of the control unit. The saved further security identifier might be identical to the actual generated security identifier. However, the further security identifier might be suitable for validating the actual security identifier without being identical. A not identical but still suitable further security identifier might comprise redundant bits that are deleted according to a specific scheme in a verification circuit. Hence, the further security identifier does not allow deriving the security identifier that can be generated from the calibration data. Further preferred, the further security identifier might be a hash value that is based on the calibration data and a set of salty bits that is different from a set of salty bits that is used for the actual security identifier. Then, both sets of salty bits used for the further security identifier and the actual security identifier must be known. Exemplarily, the salty bits of the further security identifier are non-volatilely saved on the control unit.

Alternatively, the validation of the security identifier might comprise a verification of whether or not the security identifier can be based on the calibration data at all. Therefore certain general features of the calibration data might be used. These general features may include the size of the calibration data bit set and a checksum of the security identifier, e.g. a CRC checksum, may be the object of validation. The general features may further include similarities and/or functional dependencies of certain calibration bits. Exemplarily, general knowledge about calibration bits describing a temperature dependence of an offset calibration value or a gain calibration value can be used to design a verification algorithm that is suitable for verifying whether or not true calibration data was used as basis for generation of the security identifier. The verification algorithm may be hardware encoded or programmed on the control unit. The verification algorithm may further depend on suitable verification data structures that are non-volatilely saved on the control unit and that are different from security identifier data structures that may also be saved on the control unit.

An attacker that copies the whole control unit, i.e. the non-volatile memory element, the implemented security algorithm and the verification circuit (e.g. including verification helper data) cannot amend one of these features without destroying the control unit's capability for activation or for faultless function. Basically, an identically copied verification circuit is configured to validate only one set of calibration data, i.e. the calibration data of the original control unit. However, as the copied control unit comprises transistors that are different from the transistors of the original control unit, e.g. with respect to threshold voltages, it requires different calibration data for faultless function. As a consequence, either the copied control unit will operate faultlessly, e.g. measure voltages correctly, or the copied control unit cannot be activated as the security identifier generated from the calibration data cannot be validated.

The method for activating the control unit for a battery system may further comprise the steps of inputting an activation key to a data input of the control unit and validating the generated security identifier with respect to the activation key. Therein, the validation may essentially be a comparison of an activation key and the generated security identifier that is successful if the activation key is at least partially identical to the security identifier. The activation key may be input by an authorized user that received it from the manufacturer (OEM) of the control unit.

The method may further comprise the step of performing at least one control function by the control module in response to the validation of the security identifier. The control functions may comprise the measurement of cell voltages, cell currents, cell resistances or cell capacities and, for a plurality of battery cells, may further comprise the active or passive balancing of cell voltages or cell currents. In a preferred embodiment of the invention, the activation key input to the control module must equal the security identifier generated from the calibration data for the control module to be supplied with the operation voltage. The calibration data is therein required for the control module to function faultlessly. The method may further comprise the step of connecting at least one battery cell to the control unit for supplying the operation voltage of the control unit to the control unit.

The method of the present invention may be performed multiple times for a controlled startup of a control unit for a battery system. Exemplarily, a first startup may be performed by the OEM after the first assembly of the control unit to at least one battery cell and a second startup may be performed by a licensee of the OEM that has the permission for refurbishing the battery system by replacing the original battery cells with replacement battery cells. For the second startup, the OEM may provide the license with an activation key that can be validated with respect to the security identifier that is generated from the calibration data.

Another aspect of the present invention relates to a control unit for a battery system, comprising a non-volatile memory element storing calibration data, a secure element that is configured for generating a security identifier from the calibration data using a security algorithm; and a verification circuit that is connected to the secure element and that is configured for validating the security identifier, and a control module that is configured for performing at least control function with respect to the at least one battery cell. Therein, the calibration data is based on at least one testing process performed on the control unit and is required for a faultless operation of the control module.

Preferably, the calibration data becomes stored in the non-volatile memory element during the assembly or during the testing of the control unit. In other words, the calibration data preferably becomes stored in the non-volatile memory element before an initial startup of the control unit, i.e. before an operation voltage is supplied to the control unit for the first time. According to a particularly preferred embodiment, the calibration data is hardware encoded in the startup module. In other words, the non-volatile memory element may be assembled rather than written. Exemplarily, the calibration data is encoded in the control unit using at least one fusebit; particularly preferred a non-readable fusebit. Then, the non-volatile memory element comprises the at least one fusebit. Alternatively, the non-volatile memory element is principally capable of being written and being read multiple times. The non-volatile memory element may then comprise a flash memory, an SRAM combined with a fusebit, a FeRAM, an MRAM or a phase-change memory. Further preferred, a write access of the non-volatile memory element is deactivated after the calibration data has been written to the non-volatile memory element and before the control unit is powered up for the first time.

The secure element is configured to perform a security algorithm in order to derive a security identifier from the calibration data. The secure element might comprise at least one input for receiving the calibration data and at least one output for outputting the security identifier. The secure element might comprise a hardware encoded security algorithm. Exemplarily, the secure element comprises a hardware implemented MD5 hash algorithm as described in "Hardware Implementation Analysis of the MD5 Hash Algorithm" by Jarvinen et al., 2005. Alternatively, the secure element might comprise a software implemented security algorithm. According to a preferred embodiment, the control unit comprises a data output configured for outputting an activation key from the control unit. Therein, the secure element is connected to the data output and is further configured for generating an activation key from the security identifier. The activation key might be identical to the security identifier or may be suitable for validating the security identifier and might be used in a later activation of the control unit.

Preferably, the verification circuit is configured to compare a generated security identifier with a further security identifier that was created earlier, e.g. during testing of the control unit. The verification circuit may comprise a further non-volatile memory element wherein the further security identifier is saved. Alternatively, the verification circuit might comprise a further non-volatile memory element storing suitable verification data structures non-volatilely, wherein the verification data structures are different from security identifier data structures. The verification circuit may further be configured for validating the security identifier with respect to an activation key that is input to the control unit via a suitable data input.

According to the present invention, the function of a battery system, battery module or battery cell comprising the control unit depends on the control module performing at least one control function with respect to at least one battery cell of the battery system, battery module or battery cell. The control functions may comprise the measurement of cell voltages, cell currents, cell resistances or cell capacities and, for a plurality of battery cells, may further comprise the active or passive balancing of cell voltages or cell currents. Suitable circuit designs for performing one or more of these functions are known to the skilled person. Preferably, the control module comprises means for detecting a voltage of at least one battery cell and/or the control module comprises means for balancing the voltages of a plurality of battery cells. In order to perform any of these control functions, the control module must be supplied with an operation voltage. Preferably, the prerequisite for the control module being supplied with an operation voltage is the validation of a security identifier that is generated from calibration data saved on the control unit and that is also required for faultless operation of the control module. The validation might occur with respect to general features of the security identifier and/or may require additional data stored on the control unit. Alternatively, the validation might occur with respect to an activation key that is input to the control module and does not require additional data stored on the control unit.

Further preferred, the control unit comprises a power input for an operation voltage of the control unit that is provided by at least one battery cell of the battery system and a startup module that is connected between the power input and the control module. The startup module comprises the non-volatile memory element, the secure element and the verification circuit as described above. The control unit then further comprises an activation circuit that is connected to the verification circuit and that is configured for interconnecting the power input and the control module in response to the validation of the activation key.

The activation circuit preferably comprises at least one switch element that is configured for interconnecting the power input and the control module in response to a specific output of the verification circuit. Particularly preferred, the switch element is configured to be set conductive by a specific output of the verification circuit. Particularly preferred, the switch element comprises at least one of a transistor, e.g. a BPT, a FET, JFET, MOSFET, IGBT or the like. Further preferred, the switch element comprises a loopback circuit that is configured for sustaining the conductive state of the switch element, once the switch element was set conductive for a predetermined time period. In response of receiving a verification signal, the activation circuit interconnects the power input of the control unit to the control module, i.e. provides an operation voltage to the control module.

Further preferred, the control unit comprises a data input that is configured for receiving an activation key, wherein the verification circuit is connected to the data input and to the secure element and is further configured for validating the generated security identifier with respect to the input activation key. Once an operation voltage is supplied from the power input of the control unit to its startup module, the data input is up for receiving an activation key. Preferably, a user is prompted to input the activation key, e.g. via a GUI that allows a user to input the activation key. Alternatively preferred, the data input comprises an interface and the activation key can be input to the control unit via the interface.

Once the activation key is input in the data input of the control unit and the security identifier is generated from the calibration data in the secure element, the verification circuit receives the activation key from the data input and receives the security identifier from the secure element. The verification circuit is configured to validate the activation key with respect to the security identifier. The activation key and the security identifier may each be represented by a data string or a data array of any size. The verification circuit may be configured to compare the activation key and the security identifier. The comparison may occur bitwise. The security identifier may be validated if a certain fraction of the activation key and the security identifier are equal to each other. Preferably this fraction is at least 50%, particularly preferred at least 75% and further preferred at least 95% of the size of the security identifier. The verification circuit is further configured to output a verification signal to the activation circuit, once the activation key is validated with respect to the security identifier. The amplitude and/or the polarity of the verification signal might depend on whether or not the security identifier was validated with respect to the activation key. The verification signal might be continuously output from the verification circuit once the activation key is validated or might be output as single burst.

According to a preferred embodiment of the control unit according to the invention, the verification circuit comprises an SRAM that is electrically connected to a first operation line providing a first operation voltage VDD and to a second operation line providing a second operation voltage VSS. The verification circuit further comprises a NOT gate, wherein an output node of the NOT gate is connected to an input of a first inverter that is interconnected between the first operation line and a data input of the SRAM. Further, a capacitor is interconnected between the data input of the SRAM and the second operation line. A second inverter is connected to a data output of the SRAM. Particularly preferred, the verification circuit further comprises a XNOR gate, wherein a first input of the XNOR gate is connected to the secure element that itself is fed by the non-volatile memory element and wherein a second input of the XNOR gate is connected to the data input of the control unit. Further preferred, an output of the XNOR gate is connected to an input of the NOT gate. Depending on whether or not the activation key input to the XNOR gate equals the security identifier generated from the calibration data and input to the XNOR gate, the output of the second inverter is either set high or low. This output is sustained as long as the operation voltages are supplied to the activation circuit.

According to a preferred embodiment, the activation circuit comprises at least one differential amplifier configured for amplifying the data output of the verification circuit. The differential amplifier comprises an inverting input and a non-inverting input, wherein the inverting input is interconnected with the output of the verification circuit and wherein a reference voltage is input to the non-inverting input. The reference voltage may be derived from one of the first and the second operation voltages of the control unit, e.g. via a voltage divider and/or using a memory. The differential amplifier further comprises a first supply input and a second supply input, wherein the first and second operation voltage are supplied to the supply inputs, respectively. Further preferred, the differential amplifier is configured as an operational amplifier and comprises a feedback circuit, e.g. a negative feedback. Alternatively, the differential amplifier is configured as a comparator.

Further preferred, the activation circuit of the control unit according to the invention comprises at least one switch element that is configured for interconnecting the power input and the control module in response to a specific output of the differential amplifier. Particularly preferred, the switch element is configured to be set conductive by a specific output of the amplifier, i.e. by an output with specific polarity. Particularly preferred, the switch element comprises at least one of a transistor, e.g. a BPT, a FET, JFET, MOSFET, IGBT or the like. Further preferred, the switch element comprises a loopback circuit.

According to a further preferred embodiment, the control unit further comprises at least one measurement circuit configured for measuring a physical quantity input to the measurement circuit. Particularly preferred, the control unit comprises at least one voltage measurement circuit that is configured for measuring a voltage applied to an input of the voltage measurement circuit. The measurement circuit may comprise means for measuring values of a voltage, a current, a capacity or the like of at least one battery cell. The calibration data on the non-volatile memory element preferably comprises at least one offset calibration value and/or at least one gain calibration value for each measurement circuit.

Further preferred, the non-volatile memory element storing the calibration data is not accessible from outside the control unit. Usually there is no use for the calibration data outside the control unit they are saved on. Hence, the non-volatile memory element may not comprise an interface for accessing the calibration data saved thereon. This makes it more difficult for an attacker to alter the calibration data and even to read out the calibration data.

In the context of the present invention, a control unit for a battery system can be one of a BMS, BMU or CSC and may further be an electronic circuit that is configured for controlling an individual battery cell. Usually a control unit comprises one or more integrated circuits (ICs) mounted on a suitable circuit carrier, e.g. a printed circuit board (PCB). A control unit according to the present invention might be continuously powered by at least one battery cell that is controlled by the control unit, e.g. as a part of the battery system or the battery module that is controlled by the control unit. Preferably, the control unit is powered by the at least one battery cell during the whole service life of the battery system, battery module or battery cell. However, the control unit according to the invention is capable of being activated multiple times, wherein the activation of the control unit requires the validation of a security identifier that is generated from calibration data that itself is required for faultless operation of the control unit.

Another aspect of the present invention relates to a battery system, comprising a control circuit according to the present invention as described above. The control unit is preferably part of at least one of a battery management system (BMS), a battery monitoring unit (BMU) or a cell supervision circuit (CSC) of the battery system. The battery system further comprises a plurality of battery cells and/or battery modules and may further comprise a cooling system.

Another aspect of the present invention relates to the use of calibration data of a control unit for a battery system for generating a security identifier for identification and authentication of the control unit. The calibration data is based on at least one testing process performed on the control unit and is also required for a faultless operation of the control unit. The calibration data might comprise offset calibration values and/or gain calibration values as described above. The validation might be performed with respect to an input activation key as described above and might be part of an activation method as described above and/or an authentication process.

Further aspects of the present invention are disclosed in the dependent claims or the following description of the drawings.

BRIEF DESCRIPTION OF DRAWINGS

Features will become apparent to those of ordinary skill in the art by describing in detail exemplary embodiments with reference to the attached drawings in which:

FIG. 1 schematically illustrates the workflow for the production of a battery system;

FIG. 2 illustrates a flow diagram of methods for generating a security identifier for a control unit for a battery system and for generating an activation key for such control unit;

FIG. 3 illustrates a flow diagram of a method for activating a control unit for a battery system according to an embodiment;

FIG. 4 schematically illustrates a control unit according to an embodiment; and

FIG. 5 schematically illustrates exemplary circuit diagrams of a startup module according to an embodiment;

FIG. 6 schematically illustrates a circuit diagram of a secure element according to an embodiment; and FIG. 7 schematically illustrates the secure element of FIG. 6 for a certain calibration data input.

MODE FOR THE INVENTION

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art.

Accordingly, processes, elements, and techniques that are not considered necessary to those having ordinary skill in the art for a complete understanding of the aspects and features of the present invention may not be described. In the drawings, the relative sizes of elements, layers, and regions may be exaggerated for clarity.

As used herein, the term "and/or" includes any and all combinations of one or more of the associated listed items. Further, the use of "may" when describing embodiments of the present invention refers to "one or more embodiments of the present invention." In the following description of embodiments of the present invention, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

FIG. 1 schematically illustrates a workflow for a production process of a battery system 100 comprising four essential steps, particularly with respect to a control unit 10 according to the present invention.

As shown in FIG. 1, a first step (A) in the production process of a battery system 100 is the manufacturing of a semiconductor control unit 10 on wafer level 1 by a semiconductor chip manufacturer. The manufacturing process on wafer level 1 comprises at least the steps of FEOL and of BEOL. During FEOL the individual devices, e.g. transistors, resistors and the like, are patterned in the semiconductor IC control units 10. During BEOL the individual devices are interconnected using a variety of metallic interconnect structures, e.g. vias.

In a second step (B) of the production process of a battery system 100, several testing procedures are performed on the individual devices and the interconnecting structures on wafer level. In the testing procedures, several electronic functions of the control unit 10 are tested, particularly with respect to at least one control function of the control unit 10. The testing might comprises voltage measurement tests, wherein predetermined voltages are applied to and measured with the control unit 10. Particularly preferred, the voltage measurement tests might comprise an offset calibration, i.e. by measuring a detected voltage if no voltage is applied to the control unit, and may further comprise a gain calibration, i.e. by measuring a detected voltage if a predetermined voltage is applied to the control unit. The offset calibration may be performed at a plurality of different temperatures and the gain calibration may be performed at a plurality of different temperatures and/or for a plurality of different reference voltages. The result of such calibration processes is calibration data that may comprise a plurality of offset calibration values and a plurality of gain calibration values.

The calibration data is then written to the plurality of control units 10 present on the wafer 1. FIG. 1 (B) shows a detailed view of the wafer 1, wherein the area of a single control unit 10 is enclosed by dicing lines 4. The control unit 10 comprises write lines 5 for a flash memory (not shown) as non-volatile memory element 15a of the control unit 10. For each control unit 10 the calibration data is written to a respective flash memory 15a of the control unit 10 using the write lines 5. In other words, the initial three steps of the method as illustrated in FIG. 2 are performed during steps (B) of the production method as illustrated in FIG. 1.

In a third step (C) of the production process of battery system 100, wafer dicing occurs along dicing lines 4. Therein, the wafer 1 is segmented in order to form the individual control units 10. Therein, the write lines 5 that were disposed partially within the dicing lines 4 are cut and thus, the write access to the flash memory of the control unit 10 is disabled.

In a fourth step (D) of the production process of battery system 100, the individual control units 10 are packaged using suitable dielectrics such as epoxy, silicon or polyimide in order to protect the IC from environmental influences. Further, the control unit 10 is attached to a lead frame 31 for providing multiple electric connections to the control unit 10.

In a fifth step (E) of the workflow shown in FIG. 1, the control unit 10 is assembled on a suitable circuit carrier 20, such as a printed circuit board (PCB) or flexible circuit board. Exemplarily, the control unit 10 is flip-chip mounted to the circuit carrier 20. Electric connections between the control unit 10 and the circuit carrier 20 may be established by soldering.

In a sixth step (F) of the workflow of FIG. 1, the circuit carrier 20 comprising the control unit 10 is mounted to a plurality of secondary battery cells 80 in order to form a battery module 90. Particularly, the terminals (not shown) of each of the battery cells 80 are connected to the circuit carrier 20 via wire bonds 35. The battery cells 80 are thus connected to the control unit 10 and an operation voltage is supplied to the control unit 10 by at least one of the battery cells 80. The battery cells 80 may further be interconnected with each other via busbars 30.

By applying the operation voltage to the power input 11 of the control unit 10 during step (F) of the production process, the steps four to six of the method as illustrated in FIG. 2 are performed. In other words, the control unit 10 enters a mode for generating a security identifier as the operation voltage is supplied to the control unit 10. In response to the operation voltage being supplied to the control unit 10, calibration data is output from the non-volatile memory element 15a to a secure element 15b that generates a security identifier from the calibration data. However, the steps four to six of the method as illustrated in FIG. 2 could also be performed during step (B) of the method as illustrated in FIG. 1.

During step (F) of the production process also the steps seven and eight of the method as illustrated in FIG. 2 might be performed. That is, an activation key is generated by the secure element 15b based on the security identifier and the activation key is output from the secure element 15b via a data output of the control unit 10. Preferably, the activation key is output to a user of the control unit 10, e.g. an employee of the OEM that is assembling the battery module 90. However, the steps four to eight of the method as illustrated in FIG. 2 could also be performed during step (B) or (G) of the method as illustrated in FIG. 1.

FIG. 3 illustrates a method for activating a control unit according to the present invention. This method is initiated with a power on step, wherein an operation voltage is supplied to a power input 11 of the control unit 10. In a subsequent second step, calibration data is output from a non-volatile memory element 15a to a secure element 15b of the control unit 10, wherein a security identifier is generated from the calibration data. In the third step an activation key is input to the control unit 10 via a data input of the control unit 10.

After the input of the activation key, in a fourth step of the startup method as illustrated in FIG. 2 the input activation key is validated with respect to the security identifier. In the illustrated embodiment, the validation comprises the comparison of the activation key with the security identifier. If the validation of the activation key and the security identifier is positive, i.e. if the activation key equals the security identifier, the control unit 10 is activated, i.e. a control module 13 of the control unit 10 is activated by supplying an operation voltage to the control module 13. If the validation of the activation key is negative, i.e. if the input activation key does not equal the security identifier, the operation voltage is not supplied to the control module 13 and the control module 13 is not activated, i.e. deactivated, with respect to performing at least one control function with respect to at least one battery cell 80.

After a successful validation of the activation key with respect to the security identifier, step (G) of the production process illustrated in FIG. 1 may occur. Therein, a plurality of battery modules 90 is connected to each other to form the battery system 100. Therein, the terminals (not shown) of the battery modules 90 are connected to each other using busbars (not shown). Further the CSCs 10 of the battery modules 90 are connected to each other as well as to a BMS (not shown) using a suitable communication bus, e.g. SPI or CAN. The plurality of interconnected battery modules 90 is placed in a housing 101 and a cooling circuit may be set up for cooling the battery modules 90. The plurality of battery modules 90 provides a system voltage and system current via the system terminals 102, 103.

As further illustrated in FIG. 2, the control unit 10 of the invention may be turned off by depriving a power supply to the control unit 10. This might occur at the end of service life of the battery module 90 supplying the control unit 10 or when the control unit 10 is separated from that battery module 90. If the control unit 10 is powered on again after being turned of, e.g. by connecting the control unit 10 to a replacement battery cell, the startup method starts again as illustrated in FIG. 2. In other words, the control unit 10, particularly the power input 11 and the startup module 12, again receives an operation voltage, calibration data output from the non-volatile memory 15a to the secure element 15, a security identifier is generated from the calibration data in the secure element 15b, and a user is prompted for inputting an activation key to the control unit 10.

The second startup of the control unit 10 proceeds in that an input activation key is validated with respect to the security identifier, i.e. that it is compared to the security identifier. If the validation of the activation key and the security identifier is positive, i.e. if the activation key equals the security identifier, the control unit 10 is activated, i.e. the control module 13 of the control unit 10 is activated by supplying an operation voltage to the control module 13. If the validation of the activation key is negative, i.e. if the input activation key does not equal the security identifier, the operation voltage is not supplied to the control module 13 and the control module 13 is not activated, i.e. deactivated, with respect to performing at least one control function with respect to at least one battery cell 80. In other words, the control unit 10 according to the invention can be powered up repeatedly, as long as a correct valid activation key is input to the control unit 10 at each startup of the control unit 10.

FIG. 4 schematically illustrates a control unit 10 for a battery system 100 according to an embodiment. The control unit 10 comprises a power input 11 that is configured to be connected to at least one battery cell 80 for receiving an operation voltage of the control unit 10. The power input 11 preferably comprises a contact pad that is configured to be electrically connected to at least one battery cell 80, e.g. via at least one wire bond or the like.

The power input 11 is electrically connected to a control module 13 via a startup module 12.

The control module 13 is configured to perform at least one control function with respect to at least one battery cell. The control functions may comprise the measurement of cell voltages, cell currents, cell resistances or cell capacities and, for a plurality of battery cell, may further comprise the active or passive balancing of cell voltages or cell currents. The control module 13 may comprise at least one contact pad (not shown) for establishing an electronic contact to at least one battery cell 80. The electronic contact may be established via a wire bond 35 that is different from the wire bond for connecting at least one battery cell 80 with the power input 11 of the control module 10.

The startup module 12 is configured for performing an activation method of the control unit 10 as described above and comprises a data input 14 as well as a non-volatile memory element 15a and a secure element 15b, wherein the latter two are illustrated as a single element depicted by reference sign 15. The startup module 12 further comprises a verification circuit 16 and an activation circuit 17. The data input 14 and the non-volatile memory element 15a are connected with the verification circuit 16 and the verification circuit 16 is connected with the activation circuit 17.

The data input 14 is configured to receive an activation key and preferably is configured to prompt a user for inputting an activation key.

The non-volatile memory element 15a is configured to safe calibration data and to output the calibration data to the secure element 15b in response to an operation voltage being applied to the startup module 12. The secure element 15b is configured to receive the calibration data and to generate a security identifier from the calibration data based on a security algorithm.

The verification circuit 16 is configured to validate an activation key input in the data input 14 with respect to a security identifier output from the secure element 15b, e.g. to compare the input activation key with an output security identifier, and to output a verification result.

The activation circuit 17 is configured to receive the verification result from the verification circuit 16 and to provide an electrical connection between the power input 11 and the control unit 13 in dependence of the verification result. The activation circuit 16 comprises at least one switch element.

FIG. 5 illustrates exemplary circuit diagrams of a verification circuit 16 and an activation circuit 17 according to the present invention.

The left section of FIG. 5 illustrates a schematic circuit diagram of a verification circuit 16 according to an embodiment of the invention. The verification circuit 16 comprises an XNOR gate 41 with a first input connected to a data input 14 and with a second input connected to a secure element 15b that itself is connected to a non-volatile memory element 15a. An output of the XNOR gate 41 is connected to the input of a NOT gate 42. An output of the NOT gate 42 is connected to the input of an inverter 43 that is interconnected between a first operation line 58 that provides a first operating voltage VDD and a data input of an SRAM 46. A capacitor 44 is interconnected between a second operation line 59 and the data input 45 of the SRAM 46.

The SRAM 46 comprises a first SRAM inverter and a second SRAM inverter. Each of the first SRAM inverter and the second SRAM inverter are connected to the first operation line 58 providing operation voltage VDD and to the second operation voltage line 59 providing second operation voltage VSS. An input node of the first SRAM inverter is electrically connected to a data input 45 of the SRAM 46. The input node 45 of the first SRAM inverter is further electrically connected to the gate of a p-channel MOSFET interconnected between the first operation line 58 and a data output 47 of the SRAM 46. The input node of the first SRAM inverter is further electrically connected to the gate of an n-channel MOSFET interconnected between the second operation line 59 and the data output 47 of the SRAM 46. The data output 47 of the SRAM 46 is electrically connected to an input node of the second SRAM inverter that is connected to the gate of a further p-channel MOSFET interconnected between the first operation line 58 and the data input 45 of the SRAM 46. The input node of the second SRAM converter is further electrically connected to the gate of a further n-channel MOSFET interconnected between the second operation line 59 and the data input 45 of the SRAM 46. The SRAM 46 is set to an operating state as soon as the first and second operation voltages are supplied to the SRAM 46. A logic value input to the data input 45 of SRAM 46 is encoded by either the first operation voltage VDD ("1") or the second operation voltage VSS ("0"). A logic value input to the data input 45 is inverted by the first SRAM inverter and the inverted value is supplied to the data output 47 of the SRAM 46. The inverted value is further input to the second SRAM inverter and thus reproduces the initial logic value at the data input 45. The logic value supplied to the data input 45 of the SRAM 46 is thus memorized in the SRAM 46 as long as the operation voltages are supplied.

During activation, the data input 45 of the SRAM 46 is set to logic value "0" via the capacitor 44 and thus a predetermined value is input to the SRAM 46 and a verification output of the verification circuit 16 is set to "0". If a signal, e.g. a single bit of an input activation key represented by a certain voltage, that is applied to a first input of the XNOR gate 41 equals a signal, e.g. a single bit of a generated security identifier represented by a certain voltage, that is applied to the second input of the XNOR gate 41, the output of the XNOR gate 41 is set to a logic value "1", e.g. represented by first operation voltage VDD. The NOT gate 42 inverts the logic value and hence a logic "1" is applied to the data input 45 of the SRAM 46 by the first inverter 43. The SRAM 46 then outputs a logic value "0" that is again inverted by the second inverter 48 such that a logic value "1" is output by the verification circuit 16. The verification signal output from the verification circuit 16 thus depends on the validation result of the activation key and can be sustained at the verification output as long as the operation voltages VDD, VSS apply.

The right section of FIG. 5 illustrates a schematic circuit diagram of an activation circuit 17 according to an embodiment of the invention. The illustrated embodiment of the verification circuit 17 comprises at least one operational amplifier 54. A first operation voltage VDD is supplied to first supply input of the operational amplifier 54 by the first operation line 58 and a second operation voltage VSS is supplied to a second supply input of the differential amplifier 54 by a second operation line 59. The operational amplifier 54 further comprises an inverting input ("−") and a non-inverting input ("+"). The voltage level at the output of the verification circuit 16 is supplied to the inverting input of the operational amplifier 54.

Activation circuit 17 further comprises a voltage divider with a first resistor 51 interconnected between the first operation line 58 and the non-inverting input of operational amplifier 54 and with a second resistor 52 interconnected between the second operation line 59 and the non-inverting input of the operational amplifier 54. The resistance of the first resistor 51 equals the resistance of the second resistor 52 and thus half of the first operation voltage VDD is supplied to the non-inverting input of operational amplifier 54 as a reference voltage. Hence, an output of the operational amplifier 54 is set to a maximal positive voltage if a logic value "1" is applied to the output of the verification circuit 16 and is set to minimal negative voltage if a logic value "0" is applied to the output of the verification circuit 16. The output of amplifier 54 is fed back to the inverting input via a third resistor 53. Thus, the output of operational amplifier 54 is further amplified.

The activation circuit 17 further comprises an n-channel IGBT 57 as a switch element. The gate of the IGBT 57 is connected to the output of operational amplifier 54, the collector of IGBT 57 is connected to the power input 11 of the control unit 10 and the emitter of the IGBT 57 is connected to the control module 13 of control unit 10. If consistently a logic value "1" is output by the verification circuit 16, the operational amplifier 54 outputs an amplified positive voltage. Thus, IGBT 57 is set conductive and provides a conductive connection between the power input 11 and the control module 13 of control unit 10. Control unit 13 is thus enabled to perform at least one control function. Once the IGBT 57 is set conductive, the emitter of IGBT 57 is connected with the gate of IGBT 57 via a third resistor 56 and via a transformer 55. This loopback connection provides that the IGBT 57 stays conductive once it is conducting the operation voltage from the power input 10 to the control module 13 for a certain time period. The duration of the time period is thereby set by the resistance of the third resistor 56 and the inductivity of the transformer 55. The loopback circuit may comprise a further inductivity for delaying the power transport from the emitter of the IGBT 57 to the gate of the IGBT 57.

FIG. 6 is a schematic illustration of a circuit diagram of a secure element 15b according to an embodiment. Therein, the secure element is a linear feedback shift register comprising a plurality of inputs $a_i$ connected to a non-volatile memory element 15a of the control unit 10 and a plurality of flip-flops $r_i$. Each input $a_i$ receives a calibration data bit stored in the non-volatile memory element 15a and combines it with an output of an flip-flop $r_i$ via an AND gate. The outputs of the AND gates are combined via a chain of XOR gates, wherein an output of the last XOR gate is connected to a first-flop $r_1$. An output of the secure element is a second input to the XNOR gate 41.

FIG. 7 schematically illustrates the secure element of FIG. 6 for a certain calibration data input, wherein the calibration data bits are $a_1=1$, $a_2=0$, $a_3=0$ and $a_4=1$. Then the logic function realized by the linear feedback shift register as shown in FIG. 6 is equivalent to the circuitry shown in FIG. 6. The security identifier output of the secure element 15b thus is a pseudo-random number that depends on the calibration data $a_i$ input from the non-volatile memory element 15a. A new value for the security identifier might be output from the secure element 15b with every clock, i.e. every edge of a clock signal CLK.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g. on a PCB or another kind of circuit carrier. The conducting elements may comprise metallization, e.g. surface metallizations and/or pins, and/or may comprise conductive polymers or ceramics. Further electrical energy might be transmitted via wireless connections, e.g. using electromagnetic radiation and/or light.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

The invention claimed is:

1. A method of generating a security identifier for a control unit of a battery system, the method comprising the steps of:
   supplying an operation voltage to the control unit;
   outputting calibration data from a non-volatile memory element of the control unit;
   generating a security identifier from the calibration data using a security algorithm; and
   performing at least one testing process on the control unit, wherein the calibration data is based on the at least one testing process performed on the control unit and is required for a faultless operation of the control unit.

2. The method according to claim 1, further comprising the steps of:
   generating the calibration data for the control unit based on the at least one testing process; and
   writing the calibration data to the non-volatile memory element of the control unit.

3. The method according to claim 2,
   wherein the control unit comprises at least one measurement circuit configured to measure a physical quantity input to the measurement circuit,
   wherein the at least one testing process comprises an offset calibration test and/or a gain calibration test on the measurement circuit, and
   wherein the generation of the calibration data comprises generating at least one offset calibration value and/or at least one gain calibration value for each measurement circuit.

4. The method according to claim 1, wherein the security algorithm is one of a hash function algorithm, a public key algorithm, or a private key algorithm.

5. A method of generating an activation key for a control unit of a battery system, the method comprising the steps of the method according to claim 1 and further comprising the steps of:
   generating an activation key based on the security identifier; and
   outputting the activation key from the control unit.

6. A method of activating a control unit for a battery system, the control unit comprising: a power input for an operation voltage provided by at least one battery cell; a control module configured to perform at least one control function with respect to the at least one battery cell; and a startup module connected between the power input and the control module, the method comprising the steps of:
   supplying an operation voltage of the control unit to the power input by the at least one battery cell;
   generating a security identifier from calibration data stored in a non-volatile memory element of the control unit using a security algorithm;
   validating the generated security identifier; and
   interconnecting the power input and the control module in response to the validation of the security identifier, wherein the calibration data is based on at least one testing process performed on the control unit and is required for a faultless operation of the control unit.

7. The method of claim 6, further comprising the steps of:
inputting an activation key into a data input of the control unit; and
validating the generated security identifier with respect to the activation key.

8. A control unit for a battery system comprising:
a non-volatile memory element storing calibration data;
a secure element configured to generate a security identifier from the calibration data using a security algorithm;
a verification circuit configured to validate the security identifier; and
a control module configured to perform at least one control function with respect to at least one battery cell,
wherein the calibration data is based on at least one testing process performed on the control unit and is required for a faultless operation of the control module.

9. The control unit according to claim 8, further comprising a data output configured to output an activation key from the control unit,
wherein the secure element is connected to the data output and is further configured to generate an activation key from the security identifier.

10. A battery system comprising a control circuit according to claim 9 as part of at least one of a battery management system, battery monitoring unit, or cell supervision circuit.

11. The control unit according to claim 8, further comprising:
a power input for an operation voltage of the control unit provided by the at least one battery cell;
a startup module connected between the power input and the control module and comprising the non-volatile memory element, the secure element and the verification circuit; and
an activation circuit configured to interconnect the power input and the control module in response to validation of the security identifier.

12. The control unit according to claim 8, further comprising a data input configured to receive an activation key,
wherein the verification circuit is connected to the data input and to the secure element and is configured to validate the generated security identifier with respect to an input activation key.

13. The control unit according to claim 8, further comprising at least one measurement circuit configured to measure a physical quantity input to the measurement circuit,
wherein the calibration data comprises at least one offset calibration value and/or at least one gain calibration value for each measurement circuit.

14. The control unit according to claim 8, wherein the non-volatile memory element is not accessible from outside the control unit.

15. A method of using calibration data of a control unit for a battery system to generate a security identifier for identification and authentication of the control unit,
wherein the calibration data is based on at least one testing process performed on the control unit and is required for a faultless operation of the control unit.

\* \* \* \* \*

UNITED STATES PATENT AND TRADEMARK OFFICE
CERTIFICATE OF CORRECTION

PATENT NO. : 11,106,782 B2
APPLICATION NO. : 16/343220
DATED : August 31, 2021
INVENTOR(S) : Maximilian Hofer It is certified that error appears in the above-identified patent and that said Letters Patent is hereby corrected as shown below:

On the Title Page

Item (73) Assignee          Delete "LTD," and
                            Insert -- LTD., --.

In the Claims

Column 21, Line 30, Claim 10    Delete "battery system comprising a control circuit", and
                                Insert -- battery system comprising a control unit --.

Signed and Sealed this
Eighteenth Day of October, 2022

Katherine Kelly Vidal
*Director of the United States Patent and Trademark Office*